United States Patent
Zhang et al.

(10) Patent No.: US 10,437,816 B2
(45) Date of Patent: Oct. 8, 2019

(54) METHOD AND APPARATUS FOR RECONSTRUCTING CUBE IN MULTIDIMENSIONAL ONLINE ANALYTICAL PROCESSING SYSTEM

(71) Applicant: Huawei Technologies Co., Ltd., Shenzhen (CN)

(72) Inventors: Yong Zhang, Hangzhou (CN); Bian Yin, Shenzhen (CN); Dandan Tu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 466 days.

(21) Appl. No.: 15/264,294

(22) Filed: Sep. 13, 2016

(65) Prior Publication Data
US 2017/0004170 A1    Jan. 5, 2017

Related U.S. Application Data

(63) Continuation of application No. PCT/CN2015/072568, filed on Feb. 9, 2015.

(30) Foreign Application Priority Data

Mar. 14, 2014   (CN) .......................... 2014 1 0097447

(51) Int. Cl.
*G06F 16/00*    (2019.01)
*G06F 16/23*    (2019.01)
(Continued)

(52) U.S. Cl.
CPC .......... *G06F 16/2365* (2019.01); *G06F 16/27* (2019.01); *G06F 16/283* (2019.01)

(58) Field of Classification Search
CPC ...... G06F 16/283; G06F 16/2365; G06F 8/65; G06F 16/27
(Continued)

(56) References Cited

U.S. PATENT DOCUMENTS

| 5,918,232 A | * | 6/1999 | Pouschine | ............. | G06F 16/283 |
| | | | | | 707/999.103 |
| 6,542,895 B1 | | 4/2003 | DeKimpe et al. | | |

(Continued)

FOREIGN PATENT DOCUMENTS

| CN | 1551014 A | 12/2004 |
| CN | 102171648 A | 8/2011 |

(Continued)

OTHER PUBLICATIONS

Foreign Communication From a Counterpart Application, Korean Application No. 10-2016-7027904, Korean Office Action dated Jul. 27, 2017, 4 pages.

(Continued)

*Primary Examiner* — Vincent F Boccio
(74) *Attorney, Agent, or Firm* — Conley Rose, P.C.

(57) ABSTRACT

A method and an apparatus for reconstructing a cube in a multidimensional online analytical processing (MOLAP) system, where a cube is reconstructed based on a received reconstruction request and data stored in an old cube, and there is no need to acquire, from a database, data required for updating the cube, thereby ensuring data integrity when model reconstruction and data reconstruction are performed in the MOLAP system.

15 Claims, 4 Drawing Sheets (51) Int. Cl.
  *G06F 16/27* (2019.01)
  *G06F 16/28* (2019.01)
(58) Field of Classification Search
  USPC ........................................................ 707/690
  See application file for complete search history.

(56) References Cited

U.S. PATENT DOCUMENTS

| | | | |
|---|---|---|---|
| 6,546,395 | B1 | 4/2003 | DeKimpe et al. |
| 7,181,450 | B2 * | 2/2007 | Malloy .................. G06F 16/283 707/999.004 |
| 7,716,167 | B2 | 5/2010 | Colossi et al. |
| 2004/0193576 | A1 * | 9/2004 | Petculescu ............ G06F 16/283 707/999.003 |
| 2007/0022120 | A1 | 1/2007 | Huang et al. |
| 2011/0055146 | A1 | 3/2011 | Mahajan et al. |

FOREIGN PATENT DOCUMENTS

| | | |
|---|---|---|
| CN | 102193877 A | 9/2011 |
| CN | 103870571 A | 6/2014 |
| KR | 20080031202 A | 4/2008 |
| KR | 20110023756 A | 3/2011 |

OTHER PUBLICATIONS

Foreign Communication From a Counterpart Application, Korean Application No. 10-2016-7027904, English Translations of Korean Office Action dated Jul. 27, 2017, 2 pages.

Foreign Communication From a Counterpart Application, Korean Application No. 10-2016-7027904, Korean Notice of Allowance and Brief Translation of dated Jan. 4, 2018, 3 pages.

Foreign Communication From a Counterpart Application, Chinese Application No. 201410097447.5, Chinese Office Action dated Aug. 11, 2016, 6 pages.

Foreign Communication From a Counterpart Application, PCT Application No. PCT/CN2015/072568, English Translation of International Search Report dated May 28, 2015, 2 pages.

Foreign Communication From a Counterpart Application, PCT Application No. PCT/CN2015/072568, English Translation of Written Opinion dated May 28, 2015, 9 pages.

* cited by examiner

METHOD AND APPARATUS FOR RECONSTRUCTING CUBE IN MULTIDIMENSIONAL ONLINE ANALYTICAL PROCESSING SYSTEM

CROSS-REFERENCE TO RELATED APPLICATIONS

This application is a continuation of International Application No. PCT/CN2015/072568, filed on Feb. 9, 2015, which claims priority to Chinese Patent Application No. 201410097447.5, filed on Mar. 14, 2014. The disclosures of the aforementioned applications are hereby incorporated by reference in their entireties.

TECHNICAL FIELD

The present disclosure relates to computer technologies, and in particular, to a method and an apparatus for reconstructing a cube in a multidimensional online analytical processing (MOLAP) system.

BACKGROUND

Online analytical processing (OLAP) is a type of software technology that enables an analyst, an administrator, or an executive to rapidly, consistently, and interactively store and acquire information from multiple perspectives, thereby obtaining a deeper understanding of data. OLAP may be implemented in multiple manners, and MOLAP based on multidimensional data is a main implementation manner. In MOLAP, multidimensional data used in OLAP is acquired from a database, and the foregoing data is physically stored in a form of a multidimensional array to form a "cube". The cube is formed by two parts: a model of the cube and data stored in the cube, where the model of the cube refers to a data structure that is used to store data. Picturesquely, assuming that the data is an object, the model of the cube is a container that is used to accommodate the object, and the data structure of the model of the cube is a shape structure of the container. Using a cube to store data can improve query performance of OLAP.

However, when a model of a cube or stored data needs to be updated, in the prior art, the cube is reconstructed by deleting the cube and reconstructing a new cube. For example, when a model of a cube needs to be reconstructed, the old cube is deleted, data that needs to be stored in the cube is acquired again from a database, and the acquired data is stored in a model of a new cube, thereby implementing reconstruction of the cube; or when data in a cube needs to be reconstructed, the old cube is deleted, non-updated data is extracted again from a database, and to-be-updated data and the non-updated data that is extracted again from the database are stored again in a cube, thereby implementing reconstruction of the cube.

However, after data in a database is stored in a cube, the data in the database may be lost due to a reason, and integrity of the data in the cube may be damaged when the cube is reconstructed by using the solution in the prior art and based on the data stored in the database.

SUMMARY

Embodiments of the present disclosure provide a method and an apparatus for reconstructing a cube in a multidimensional online analytical processing MOLAP system so as to ensure data integrity when model reconstruction and data reconstruction are performed in the MOLAP system.

A first aspect of the embodiments of the present disclosure provides a method for reconstructing a cube in a multidimensional online analytical processing MOLAP system, including receiving a reconstruction request submitted by a user, where the reconstruction request is used to reconstruct an old cube that is stored in a storage medium of the MOLAP system, and reconstructing the old cube according to the reconstruction request and data stored in the old cube so as to generate a new cube.

With reference to the first aspect, in a first possible implementation manner, the reconstruction request includes a model of the new cube, and the reconstructing the old cube according to the reconstruction request and data stored in the old cube so as to generate a new cube includes acquiring second data that matches a data structure of the model of the new cube from the old cube, loading the second data into the model of the new cube so as to generate the new cube, and storing the new cube and deleting the old cube.

With reference to the first possible implementation manner, in a second possible implementation manner, the acquiring second data that matches a data structure of the model of the new cube from the old cube includes acquiring first data stored in the old cube, where the first data is all data in the old cube, and selecting the second data that matches the data structure of the model of the new cube from the first data.

With reference to the first aspect, in a third possible implementation manner, the reconstruction request includes update data, and the reconstructing the old cube according to the reconstruction request and data stored in the old cube so as to generate a new cube includes determining a location of to-be-updated data in the old cube according to the update data, and correspondingly updating data in the location of the to-be-updated data to the update data so as to generate the new cube.

With reference to the third possible implementation manner, in a fourth possible implementation manner, the determining a location of to-be-updated data in the old cube according to the update data includes replicating the old cube, and using the replicated old cube as a first cube, and determining the location of the to-be-updated data in the first cube according to the update data; and the correspondingly updating data in the location of the to-be-updated data to the update data so as to generate the new cube includes correspondingly updating the data in the location of the to-be-updated data in the first cube to the update data so as to generate the new cube, and storing the new cube and deleting the old cube.

With reference to the first aspect, in a fifth possible implementation manner, the reconstruction request includes a model of the new cube and update data, and the reconstructing the old cube according to the reconstruction request and data stored in the old cube so as to generate a new cube includes acquiring third data that matches a data structure of the model of the new cube from the old cube, loading the third data into the model of the new cube so as to form a second cube, determining a location of to-be-updated data in the second cube according to the update data, correspondingly updating data in the location of the to-be-updated data in the second cube to the update data so as to generate the new cube, and storing the new cube and deleting the old cube.

A second aspect of the embodiments of the present disclosure provides an apparatus for reconstructing a cube in a MOLAP system, including a receiving module configured to receive a reconstruction request submitted by a user, where the reconstruction request is used to reconstruct an old cube that is stored in a storage medium of the MOLAP system; and a processing module configured to reconstruct the old cube according to the reconstruction request and data stored in the old cube so as to generate a new cube.

With reference to the second aspect, in a first possible implementation manner, the reconstruction request includes a model of the new cube, and the processing module includes a first data processing unit configured to acquire second data that matches a data structure of the model of the new cube from the old cube; a first data loading unit configured to load the second data into the model of the new cube so as to generate the new cube; and a first updating unit configured to store the new cube and delete the old cube.

With reference to the first possible implementation manner, in a second possible implementation manner, the first data processing unit is configured to acquire first data stored in the old cube, where the first data is all data in the old cube; and select the second data that matches the data structure of the model of the new cube from the first data.

With reference to the second aspect, in a third possible implementation manner, the reconstruction request includes update data, and the processing module includes a first processing unit configured to determine a location of to-be-updated data in the old cube according to the update data, and a second processing unit configured to correspondingly update data in the location of the to-be-updated data to the update data so as to generate the new cube.

With reference to the third possible implementation manner, in a fourth possible implementation manner, the first processing unit is configured to replicate the old cube, and use the replicated old cube as a first cube, and determine the location of the to-be-updated data in the first cube according to the update data; and the second processing unit is configured to correspondingly update the data in the location of the to-be-updated data in the first cube to the update data so as to generate the new cube; and store the new cube and delete the old cube.

With reference to the second aspect, in a fifth possible implementation manner, the reconstruction request includes a model of the new cube and update data, and the processing module includes a second data processing unit configured to acquire third data that matches a data structure of the model of the new cube from the old cube, a second data loading unit configured to load the third data into the model of the new cube so as to form a second cube, a third processing unit configured to determine a location of to-be-updated data in the second cube according to the update data, a fourth processing unit configured to correspondingly update data in the location of the to-be-updated data in the second cube to the update data so as to generate the new cube, and a second updating unit configured to store the new cube and delete the old cube.

In the method and the apparatus for reconstructing a cube in a multidimensional online analytical processing system according to the embodiments of the present disclosure, a cube is reconstructed based on a received reconstruction request and data stored in an old cube in a storage medium, and there is no need to acquire, from a database, data required for reconstructing the cube; that is, the data for reconstructing the cube is acquired from the old cube, instead of depending on the database that stores original data. Therefore, even if data in the database is lost, the reconstruction of the cube is not affected, thereby ensuring data integrity when model reconstruction and data reconstruction are performed in the MOLAP system.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

A main idea of the embodiments of the present disclosure is that when a cube is being reconstructed, the cube is reconstructed based on data stored in the cube before being reconstructed, rather than reconstructed based on data stored in a database. Therefore, even if the data in the database is lost, the reconstruction of the cube is not affected, thereby ensuring data integrity when model reconstruction and data reconstruction are performed in a MOLAP system.

Figure 1:
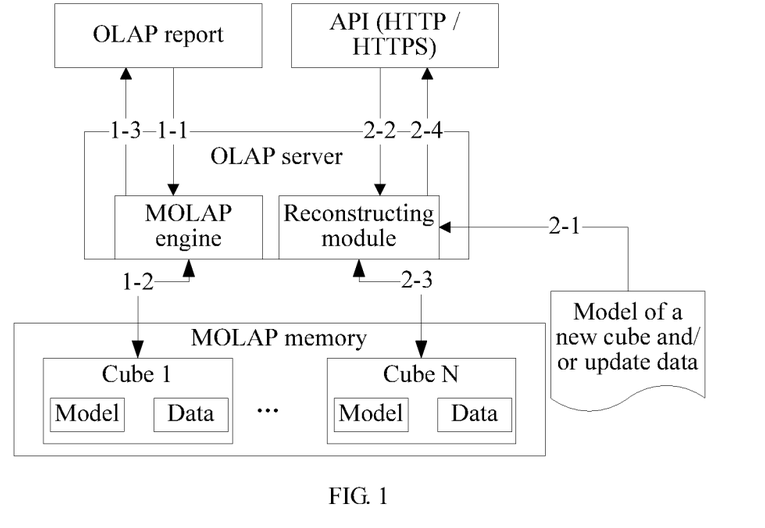
FIG. 1 is a schematic flowchart of a method for reconstructing a cube in a multidimensional online analytical processing system according to an embodiment.

FIG. 1 is a schematic flowchart of a method for reconstructing a cube in a multidimensional online analytical processing system according to an embodiment, as shown in FIG. 1.

In a general case, 1-1, 1-2 and 1-3 are a procedure of querying an OLAP report in the MOLAP system, which is as follows.

1-1. A user device sends a request from a foreground interface (OLAP report) to an OLAP server to invoke a MOLAP engine.

1-2. The MOLAP engine queries a cube in a MOLAP memory to acquire a result set.

1-3. Process the result set by using the OLAP server and present the processed result set to the user.

In FIG. 1, 2-1, 2-2, 2-3 and 2-4 are a procedure of reconstructing a cube, which is as follows:

2-1. When determining, according to a requirement, that a model of an old cube is no longer applicable, the user submits a model of a new cube to a reconstructing module of the OLAP server; or when data stored in an old cube needs to be updated, the user submits update data to a reconstructing module of the OLAP server; or when both data stored in an old cube and a model of the old cube need to be updated, the user submits update data and a model of a new cube to a reconstructing module of the OLAP server.

2-2. The user submits a parameter required by reconstruction to the OLAP server in a manner of a uniform resource locator (URL) request and invokes the reconstructing module by invoking the Hypertext Transfer Protocol Secure (HTTPS) or the Hypertext Transfer Protocol (HTTP) application programming interface (API).

2-3. The reconstructing module reconstructs the cube according to the model of the new cube, the update data, and the like that are provided by the user so as to generate the new cube.

2-4. After the reconstruction ends, return a reconstruction result to the user so that the user queries the reconstructed cube.

In the present disclosure, a cube before reconstruction is referred to as an old cube, and a cube that is obtained after the reconstruction is completed is referred to as a new cube. For ease of description, the old cube in the present disclosure is stored in a storage medium, and the storage medium may be a hard disk or a memory. Accordingly, a user may query data stored in a cube that is in a hard disk, or a user may query data stored in a cube that is in a memory. Before querying the data in the cube that is in a memory, the user needs to load the cube from the hard disk into the memory.

The following describes the technical solution of the present disclosure in detail with reference to specific embodiments. The following several specific embodiments may be combined with each other, and for a same or similar concept or process, details may not be described again in some embodiments.

Figure 2:
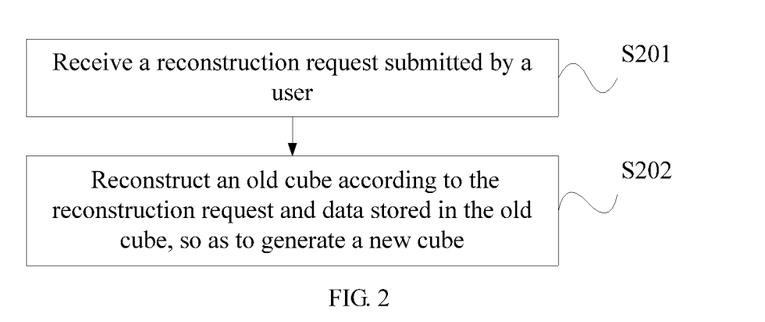
FIG. 2 is a schematic flowchart of a method for reconstructing a cube in a multidimensional online analytical processing system according to another embodiment.

FIG. 2 is a schematic flowchart of a method for reconstructing a cube in a multidimensional online analytical processing system according to another embodiment. As shown in FIG. 2, the method in this embodiment includes the following steps.

S201: Receive a reconstruction request submitted by a user.

The reconstruction request is used to reconstruct an old cube that is stored in a storage medium of the MOLAP system.

The reconstruction request includes update data and/or a model of a new cube.

For example, when determining, according to a requirement, that a model of the old cube is no longer applicable, the user submits a model of a new cube; or when data stored in the old cube needs to be updated, the user submits update data; or when both data stored in the old cube and a model of the old cube need to be updated, the user submits update data and a model of a new cube.

S202: Reconstruct an old cube according to the reconstruction request and data stored in the old cube so as to generate a new cube.

When the reconstruction request includes a model of the new cube, and the model of the old cube is reconstructed, which is as follows:

Second data that matches a data structure of the model of the new cube is acquired from the old cube, that is, the second data is data required by the data structure of the model of the new cube. For example, a data structure of the old cube includes year, month, and day, but the data structure of the new cube includes only year and month; then, data related to year and month is acquired from the old cube, and the data that is related to year and month and acquired from the old cube is referred to as the second data that matches the data structure of the model of the new cube. For another example, it is assumed that each piece of data in a data structure of the old cube is accurate to a hundredths digit, but it is required that data stored in the data structure of the new cube is accurate to a tenths digit; then, data that is accurate to the hundredths digit is processed to obtain data that is accurate to the tenths digit, and the data obtained after the processing is referred to as the second data that matches the data structure of the model of the new cube. Then, the second data is loaded into the model of the new cube so as to generate the new cube; the old cube is replaced with the new cube, that is, the new cube is stored and the old cube is deleted, and the new cube is used to provide a query service for the user.

That the second data that matches the data structure of the model of the new cube is acquired from the old cube includes but is not limited to the following two manners.

A first implementation manner is as follows. First data stored in the old cube is acquired, where the first data is all data in the old cube, and the second data that matches the data structure of the model of the new cube is selected from the first data. For example, a data structure of the old cube includes year, month, and day, but the data structure of the new cube includes only year and month; then, data related to year and month is selected from the old cube, and the data that is related to year and month and selected from the old cube is referred to as the second data that matches the data structure of the model of the new cube.

A second implementation manner is as follows. The second data that matches the data structure of the model of the new cube is directly acquired from the old cube.

A difference between the first implementation manner and the second implementation manner is that: in the first implementation manner, all the data stored in the old cube is directly acquired, and then the second data that matches the model of the new cube is selected from all the data; however, in the second implementation manner, the data (that is, the second data) required by the new cube is selectively acquired from the old cube according to the model of the new cube, and the second data is loaded into the model of the new cube so as to form the new cube; the old cube is deleted and the new cube is stored, and the new cube is used to provide a query service for the user. By using the foregoing two implementation manners, the data required by the new cube does not need to be acquired from a database, and the data required by the new cube is acquired based on the data stored in the old cube so that a reconstruction process is independent of the database, thereby improving integrity of data stored in the new cube. In addition, after the new cube is generated, the old cube is deleted and the new cube is stored, and the new cube is used to provide a query service for the user so that in a process of generating the new cube, a query operation of the user is not interrupted by the old cube, thereby improving user experience.

When the reconstruction request includes update data, the data stored in the cube is updated, and a third implementation manner is as follows. A location of to-be-updated data in the old cube is determined according to the update data; data in the location of the to-be-updated data is correspondingly updated to the update data so as to generate the new cube. By using this implementation manner, only data that needs to be updated in the cube is modified, and other non-updated data does not need to be acquired again from a database, thereby improving integrity of data stored in the new cube.

When the reconstruction request includes update data, a fourth implementation manner may also be used. Different from the third implementation manner, in the fourth implementation manner, the old cube needs to be replicated, where the replicated old cube is referred to as a first cube, and a location of to-be-updated data in the first cube is determined according to the update data; data in the location of the to-be-updated data in the first cube is correspondingly updated to the update data so as to generate the new cube; the old cube is replaced with the new cube, that is, the old cube is deleted and the new cube is stored, and the new cube is used to provide a query service for the user. By using this implementation manner, only data that needs to be updated in the cube is modified, and other non-updated data does not need to be acquired again from a database so that an update process is independent of the database, thereby improving integrity of data stored in the new cube. In addition, in a process of generating the new cube, a query operation of the user is not interrupted by the old cube, thereby improving user experience.

When the reconstruction request includes a model of the new cube and update data, a fifth implementation manner is as follows. Third data that matches the data structure of the model of the new cube is acquired from the old cube; for example, a data structure of the old cube includes year, month, and day, but the data structure of the new cube includes only year and month, then, data related to year and month is acquired from the old cube, and the data that is related to year and month and acquired from the old cube is referred to as the third data that matches the data structure of the model of the new cube; the third data is loaded into the model of the new cube so as to form a second cube; then, a location of to-be-updated data in the second cube is determined according to the update data; data in the location of the to-be-updated data in the second cube is correspondingly updated to the update data so as to form the new cube; the old cube is replaced with the new cube, that is, the new cube is stored and the old cube is deleted, and the new cube is used to provide a query service for the user. By using this implementation manner, the data required by the new cube does not need to be acquired from a database, and the data required by the new cube is acquired based on the data stored in the old cube and the update data, which is independent of the database, thereby improving integrity of data stored in the new cube. When both the model and the data that are of the cube need to be updated, the foregoing manner of updating only the model of the cube and the manner of updating only the data may also be combined for use, and this implementation manner is only one of implementation manners thereof. Persons skilled in the art may understand that another combination manner may also be used, which is not limited in the present disclosure.

Figure 3:
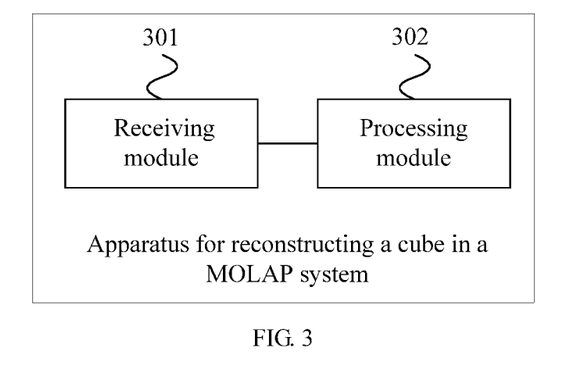
FIG. 3 is a schematic structural diagram of an apparatus for reconstructing a cube in a multidimensional online analytical processing system according to another embodiment.

FIG. 3 is a schematic structural diagram of an apparatus for reconstructing a cube in a MOLAP system according to another embodiment. As shown in FIG. 3, the apparatus in this embodiment includes a receiving module 301 and a processing module 302. The receiving module 301 is configured to receive a reconstruction request submitted by a user, where the reconstruction request is used to reconstruct an old cube that is stored in a storage medium of the MOLAP system; and the processing module 302 is configured to reconstruct the old cube according to the reconstruction request and data stored in the old cube so as to generate a new cube.

Figure 4:
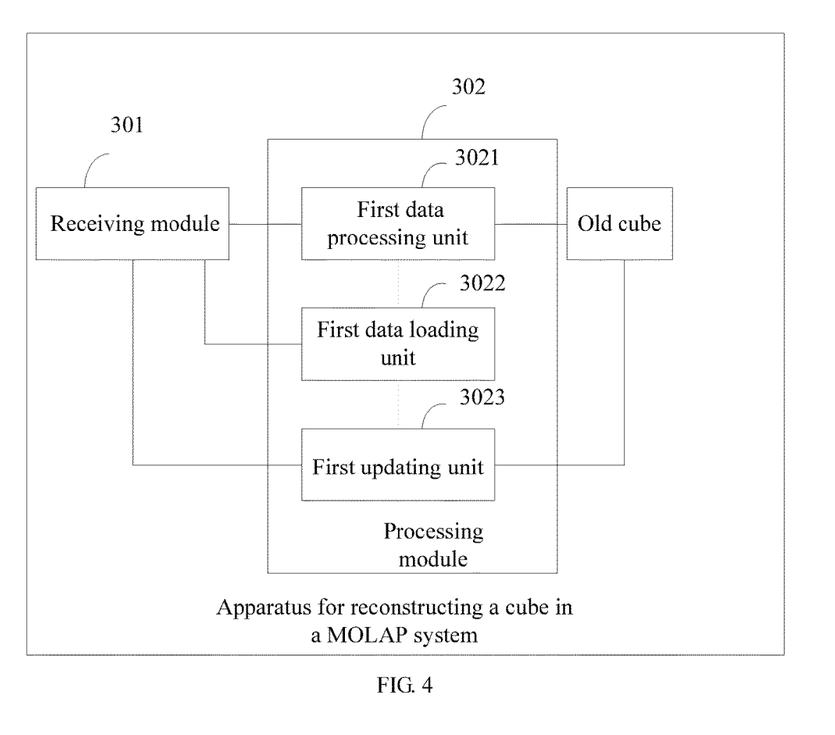
FIG. 4 is a schematic structural diagram of an apparatus for reconstructing a cube in a multidimensional online analytical processing system according to another embodiment.

FIG. 4 is a schematic structural diagram of an apparatus for reconstructing a cube in a MOLAP system according to another embodiment, and FIG. 4 is based on the embodiment shown in FIG. 3. Further, when the reconstruction request received by the receiving module 301 is a model of the new cube, the processing module 302 is configured to generate the new cube according to the reconstruction request and the data stored in the old cube. The processing module 302 includes a first data processing unit 3021, a first data loading unit 3022, and a first updating unit 3023, where the first data processing unit 3021 is configured to acquire second data that matches a data structure of the model of the new cube from the old cube; the first data loading unit 3022 is configured to load the second data into the model of the new cube so as to generate the new cube; and the first updating unit 3023 is configured to store the new cube and delete the old cube.

Further, the foregoing first data processing unit is configured to acquire first data stored in the old cube, where the first data is all data in the old cube; and select the second data that matches the data structure of the model of the new cube from the first data.

The apparatus in this embodiment may be correspondingly configured to perform the first implementation manner and the second implementation manner in the method embodiment shown in FIG. 2. By using the apparatus to perform the first implementation manner and the second implementation manner in the method embodiment shown in FIG. 2, there is no need to acquire data required by the new cube from a database, thereby ensuring data integrity when model reconstruction and data reconstruction are performed in the MOLAP system of the database. In addition, after the new cube is generated, the new cube is stored and the old cube is deleted, and the new cube is used to provide a query service for the user. In a process of generating the new cube, a query operation of the user is not interrupted by the old cube, thereby improving user experience.

Figure 5:
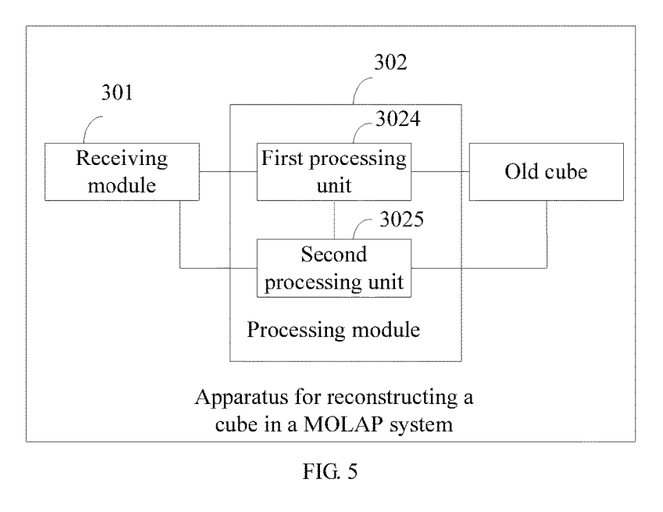
FIG. 5 is a schematic structural diagram of an apparatus for reconstructing a cube in a multidimensional online analytical processing system according to another embodiment.

FIG. 5 is a schematic structural diagram of an apparatus for reconstructing a cube in a multidimensional online analytical processing system according to another embodiment, and FIG. 5 is based on the embodiment shown in FIG. 3. Further, when the reconstruction request received by the receiving module 301 is update data, the processing module 302 includes a first processing unit 3024 and a second processing unit 3025. The first processing unit 3024 is configured to determine a location of to-be-updated data in the old cube according to the update data; and the second processing unit 3025 is configured to correspondingly update data in the location of the to-be-updated data to the update data so as to generate the new cube.

In the foregoing embodiment, further, the first processing unit 3024 is configured to replicate the old cube, and use the replicated old cube as a first cube and determine the location of the to-be-updated data in the first cube according to the update data; and the second processing unit 3025 is configured to correspondingly update the data in the location of the to-be-updated data in the first cube to the update data so as to generate the new cube and store the new cube and delete the old cube.

The apparatus in this embodiment may be correspondingly configured to perform the third implementation manner and the fourth implementation manner in the method embodiment shown in FIG. 2. By using the apparatus to perform the third implementation manner in the method embodiment shown in FIG. 2, only data that needs to be updated in the cube is modified, and other non-updated data does not need to be acquired again from a database, thereby improving integrity of data stored in the new cube. By using the apparatus to perform the fourth implementation manner in the method embodiment shown in FIG. 2, in a process of generating the new cube, a query operation of the user is not interrupted by the old cube, thereby improving user experience.

Figure 6:
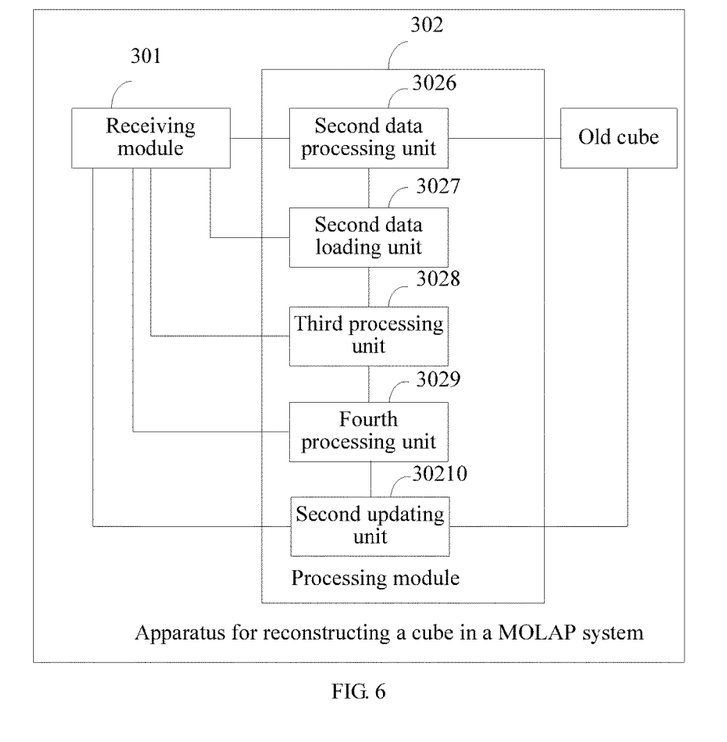
FIG. 6 is a schematic structural diagram of an apparatus for reconstructing a cube in a multidimensional online analytical processing system according to another embodiment.

FIG. 6 is a schematic structural diagram of an apparatus for reconstructing a cube in a MOLAP system according to another embodiment, and FIG. 6 is based on the embodiment shown in FIG. 3. Further, when the reconstruction request is a model of the new cube and update data, the processing module 302 includes a second data processing unit 3026, a second data loading unit 3027, a third processing unit 3028, a fourth processing unit 3029, and a second updating unit 30210. The second data processing unit 3026 is configured to acquire third data that matches a data structure of the model of the new cube from the old cube; the second data loading unit 3027 is configured to load the third data into the model of the new cube so as to form a second cube; the third processing unit 3028 is configured to determine a location of to-be-updated data in the second cube according to the update data; the fourth processing unit 3029 is configured to correspondingly update data in the location of the to-be-updated data in the second cube to the update data so as to generate the new cube; and the second updating unit 30210 is configured to store the new cube and to delete the old cube.

The apparatus in this embodiment may be correspondingly configured to perform the fifth implementation manner in the method embodiment shown in FIG. 2. By using the apparatus to perform the fifth implementation manner in the method embodiment shown in FIG. 2, there is no need to acquire data required by the new cube from a database, thereby improving integrity of data stored in the new cube.

Figure 7:
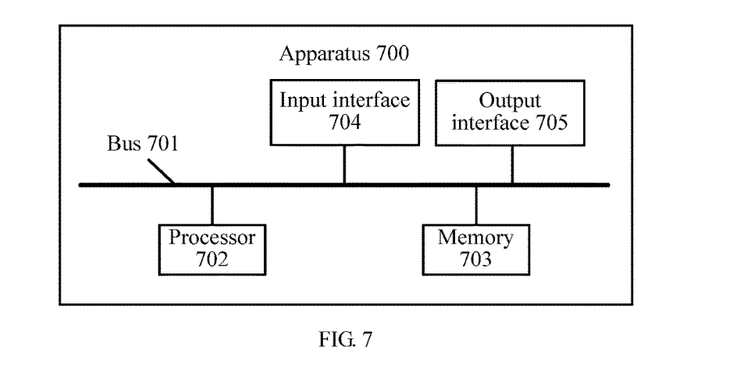
FIG. 7 is a schematic structural diagram of an apparatus for reconstructing a cube in a multidimensional online analytical processing system according to another embodiment.

FIG. 7 is a schematic structural diagram of an apparatus for reconstructing a cube in a MOLAP system according to another embodiment. This embodiment provides an apparatus 700 for reconstructing a cube in a MOLAP system, and the apparatus 700 includes a bus 701, and a processor 702, a memory 703, an input interface 704, and an output interface 705 that are connected to the bus 701. The input interface 704 is configured to receive a reconstruction request submitted by a user, where the reconstruction request is used to reconstruct an old cube that is stored in a storage medium of the MOLAP system.

The memory 703 is configured to store an instruction. The processor 702 is configured to execute the instruction, where the instruction includes reconstructing the old cube according to the reconstruction request and data stored in the old cube so as to generate a new cube.

In the foregoing embodiment, when the reconstruction request that is submitted by the user and received by the input interface 704 includes a model of the new cube, the processor 702 is configured to acquire second data that matches a data structure of the model of the new cube from the old cube, load the second data into the model of the new cube so as to generate the new cube, and store the new cube and delete the old cube.

In the foregoing embodiment, the processor 702 further acquires first data stored in the old cube, where the first data is all data in the old cube, and selects the second data that matches the data structure of the model of the new cube from the first data.

In the foregoing embodiment, when the reconstruction request that is submitted by the user and received by the input interface 704 includes update data, the processor 702 determines a location of to-be-updated data in the old cube according to the update data and correspondingly updates data in the location of the to-be-updated data to the update data so as to generate the new cube.

In the foregoing embodiment, the processor 702 further replicates the old cube, and uses the replicated old cube as a first cube; determines the location of the to-be-updated data in the first cube according to the update data; correspondingly updates the data in the location of the to-be-updated data in the first cube to the update data so as to generate the new cube; and stores the new cube and deletes the old cube.

In the foregoing embodiment, when the reconstruction request that is submitted by the user and received by the input interface 704 includes a model of the new cube and update data, the processor 702 acquires third data that matches the data structure of the model of the new cube from the old cube, loads the third data into the model of the new cube so as to form a second cube, determines a location of to-be-updated data in the second cube according to the update data, correspondingly updates data in the location of the to-be-updated data in the second cube to the update data so as to generate the new cube, and stores the new cube and deletes the old cube.

Persons of ordinary skill in the art may understand that all or some of the steps of the foregoing method embodiments may be implemented by a program instructing relevant hardware. The foregoing program may be stored in a computer-readable storage medium. When the program runs, the steps of the foregoing method embodiments are performed. The foregoing storage medium includes: any medium that can store program code, such as a read-only memory (ROM), a random access memory (RAM), a magnetic disc, or an optical disc.

Finally, it should be noted that the foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for reconstructing a cube in a multidimensional online analytical processing (MOLAP) system, comprising:
   receiving, from a user device, a reconstruction request to reconstruct a new MOLAP cube from an old MOLAP cube, wherein the old MOLAP cube comprises old MOLAP data that is stored in a storage medium of the MOLAP system, wherein the new MOLAP cube and the old MOLAP cube each comprise a cube model;

retrieving, according to the reconstruction request, the old MOLAP data from the storage medium of the MOLAP system; and generating, according to the reconstruction request and the old MOLAP data, the new MOLAP cube.

2. The method for reconstructing a cube in the MOLAP system of claim 1, wherein the reconstruction request comprises a new cube model of the new MOLAP cube, and wherein reconstructing the old MOLAP cube comprises:

acquiring, from the old MOLAP cube, second data that matches a data structure of the new cube model of the new MOLAP cube;

loading the second data into the new cube model of the new MOLAP cube so as to generate the new MOLAP cube; and storing the new MOLAP cube and deleting the old MOLAP cube.

3. The method for reconstructing a cube in the MOLAP system of claim 1, wherein the reconstruction request comprises update data, and wherein reconstructing the old MOLAP cube comprises:

determining a location of to-be-updated data in the old MOLAP cube according to the update data; and updating the to-be-updated data with the update data to generate the new MOLAP cube.

4. The method for reconstructing a cube in the MOLAP system of claim 3, wherein determining the location of to-be-updated data in the old MOLAP cube comprises:

replicating the old MOLAP cube;

using the replicated old MOLAP cube as a first MOLAP cube; and determining the location of the to-be-updated data in the first MOLAP cube according to the update data, and wherein updating the to-be-updated data with the update data comprises:

updating the to-be-updated data in the first MOLAP cube with the update data to generate the new MOLAP cube; and storing the new MOLAP cube and deleting the old MOLAP cube.

5. The method for reconstructing a cube in the MOLAP system of claim 1, wherein the reconstruction request comprises a model of the new MOLAP cube and update data, and wherein reconstructing the old MOLAP cube comprises:

acquiring third data that matches a data structure of the model of the new MOLAP cube from the old MOLAP cube;

loading the third data into the model of the new MOLAP cube to generate a second MOLAP cube;

determining a location of to-be-updated data in the second MOLAP cube according to the update data;

updating the to-be-updated data in the second MOLAP cube with the update data to generate the new MOLAP cube; and storing the new MOLAP cube and deleting the old MOLAP cube.

6. An apparatus for reconstructing a cube in a multidimensional online analytical processing (MOLAP) system, comprising:

a non-transitory storage medium comprising instructions;

a receiver coupled to the non-transitory storage medium and configured to receive a reconstruction request related to reconstructing a new MOLAP cube from an old MOLAP cube, wherein the old MOLAP cube comprises old MOLAP data that is stored in a storage medium of the MOLAP system, wherein the new MOLAP cube and the old MOLAP cube each comprise a cube model; and a processor coupled to the receiver and the non-transitory storage medium, wherein the processor is configured to:

retrieve the old MOLAP data from the storage medium of the MOLAP system; and generate the new MOLAP cube according to the reconstruction request and the old MOLAP data.

7. The apparatus for reconstructing a cube in the MOLAP system of claim 6, wherein the reconstruction request comprises a new cube model of the new MOLAP cube, and wherein the processor is further configured to:

acquire second data that matches a data structure of the new cube model of the new MOLAP cube from the old MOLAP cube;

load the second data into the new cube model of the new MOLAP cube so as to generate the new MOLAP cube; and store the new MOLAP cube and delete the old MOLAP cube.

8. The apparatus for reconstructing a cube in the MOLAP system of claim 6, wherein the reconstruction request comprises update data, and wherein the processor is further configured to:

determine a location of to-be-updated data in the old MOLAP cube according to the update data; and update the to-be-updated data with the update data so as to generate the new MOLAP cube.

9. The apparatus for reconstructing a cube in the MOLAP system of claim 8, wherein the processor is configured to:

replicate the old MOLAP cube, wherein the replicated old MOLAP cube is a first MOLAP cube;

determine the location of the to-be-updated data in the first MOLAP cube according to the update data;

update the to-be-updated data in the first MOLAP cube with the update data so as to generate the new MOLAP cube; and store the new MOLAP cube and delete the old MOLAP cube.

10. The apparatus for reconstructing a cube in the MOLAP system of claim 6, wherein the reconstruction request comprises a model of the new MOLAP cube and update data, and wherein the processor is further configured to:

acquire third data that matches a data structure of the model of the new MOLAP cube from the old MOLAP cube;

load the third data into the model of the new MOLAP cube to generate a second MOLAP cube;

determine a location of to-be-updated data in the second MOLAP cube according to the update data;

update the to-be-updated data in the second MOLAP cube with the update data so as to generate the new MOLAP cube; and store the new MOLAP cube and delete the old MOLAP cube.

11. A non-transitory computer readable medium comprising instructions stored thereon that when executed by at least one computer processor of a multidimensional online analytical processing (MOLAP) system causes the MOLAP system to:

receive, from a user device, a reconstruction request to reconstruct a new MOLAP cube from an old MOLAP cube, wherein the old MOLAP cube comprises old MOLAP data that is stored in a storage medium of the MOLAP system, and wherein the new MOLAP cube and the old MOLAP cube each comprise a cube model;

retrieve, according to the reconstruction request, the old MOLAP data from the storage medium of the MOLAP system; and generate, according to the reconstruction request and the old MOLAP data, the new MOLAP cube.

12. The non-transitory computer readable medium of claim 11, wherein the reconstruction request comprises a new cube model of the new MOLAP cube, and wherein the at least one computer processor further executes the instructions to cause the MOLAP system to:

acquire, from the old MOLAP cube, second data that matches a data structure of the new cube model of the new MOLAP cube;

load the second data into the new cube model of the new MOLAP cube so as to generate the new MOLAP cube; and store the new MOLAP cube and deleting the old MOLAP cube.

13. The non-transitory computer readable medium of claim 11, wherein the reconstruction request comprises update data, and wherein the at least one computer processor further executes the instructions to cause the MOLAP system to:

determine a location of to-be-updated data in the old MOLAP cube according to the update data; and update the to-be-updated data with the update data to generate the new MOLAP cube.

14. The non-transitory computer readable medium of claim 13, wherein the at least one computer processor further executes the instructions to cause the MOLAP system to:

replicate the old MOLAP cube;

use the replicated old MOLAP cube as a first MOLAP cube; and determine the location of the to-be-updated data in the first MOLAP cube according to the update data;

update the to-be-updated data in the first MOLAP cube with the update data to generate the new MOLAP cube; and store the new MOLAP cube and deleting the old MOLAP cube.

15. The non-transitory computer readable medium of claim 11, wherein the reconstruction request comprises a model of the new MOLAP cube and update data, and wherein the at least one computer processor further executes the instructions to cause the MOLAP system to:

acquire third data that matches a data structure of the model of the new MOLAP cube from the old MOLAP cube;

load the third data into the model of the new MOLAP cube to generate a second MOLAP cube;

determine a location of to-be-updated data in the second MOLAP cube according to the update data;

update the to-be-updated data in the second MOLAP cube with the update data so as to generate the new MOLAP cube; and store the new MOLAP cube and delete the old MOLAP cube.

* * * * *